(12) United States Patent
Ling et al.

(10) Patent No.: US 7,085,239 B2
(45) Date of Patent: *Aug. 1, 2006

(54) METHOD AND APPARATUS FOR DETERMINING THE FORWARD LINK CLOSED LOOP POWER CONTROL SET POINT IN A WIRELESS PACKET DATA COMMUNICATION SYSTEM

(75) Inventors: Fuyun Ling, San Diego, CA (US); Tao Chen, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 841 days.

This patent is subject to a terminal disclaimer.

(21) Appl. No.: 09/755,245

(22) Filed: Jan. 5, 2001

(65) Prior Publication Data

US 2002/0122397 A1   Sep. 5, 2002

(51) Int. Cl.
*G01R 31/08* (2006.01)
*H04B 7/216* (2006.01)

(52) U.S. Cl. .................. 370/252; 370/335; 370/342; 455/522

(58) Field of Classification Search ............... 370/252, 370/335, 342; 455/69, 522
See application file for complete search history.

(56) References Cited

U.S. PATENT DOCUMENTS

| 4,901,307 A | 2/1990 | Gilhousen et al. |
| 5,056,109 A | 10/1991 | Gilhousen et al. |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,506,865 A | 4/1996 | Weaver, Jr. |
| 5,903,554 A | 5/1999 | Saints |
| 5,914,959 A * | 6/1999 | Marchetto et al. .......... 370/468 |
| 6,088,324 A * | 7/2000 | Sato .......................... 370/203 |
| 6,154,659 A | 11/2000 | Jalali et al. |
| 6,167,031 A * | 12/2000 | Olofsson et al. ............. 370/252 |
| 6,603,745 B1 * | 8/2003 | Antonio et al. ............. 370/318 |

FOREIGN PATENT DOCUMENTS

| DE | 19909299 | 9/2000 |
| EP | 0853393 | 7/1998 |
| EP | 1128574 | 8/2001 |

* cited by examiner

*Primary Examiner*—Chau Nguyen
*Assistant Examiner*—Ian N. Moore
(74) *Attorney, Agent, or Firm*—Philip R. Wadsworth; Thien N. Nguyen; Roberta A. Young

(57) ABSTRACT

A novel and improved method and apparatus for performing closed loop forward link power control using a selected dedicated and power controlled forward link signal is described. A "Selected Signal Bit Error Rate" (SSBER) is estimated, where each selected signal "bit" consists of a number selected signal chips distributed over a frame. In addition, the method estimates the normalized variance of the signal energy (or C/I) for each packet. The average number of fingers in lock is also used to determine the power control set point.

41 Claims, 5 Drawing Sheets

METHOD AND APPARATUS FOR DETERMINING THE FORWARD LINK CLOSED LOOP POWER CONTROL SET POINT IN A WIRELESS PACKET DATA COMMUNICATION SYSTEM

BACKGROUND

I. Field

The disclosed embodiments relate to wireless communications. More particularly, the disclosed embodiments relate to a novel and improved method and apparatus for controlling transmission energy in a wireless communication system.

II. Background

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", which is assigned to the assignee of the present invention and fully incorporated herein by reference. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", which is assigned to the assignee of the present invention and fully incorporated herein by reference.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501 entitled "METHOD AND SYSTEM FOR PROVIDING A SOFT HANDOFF IN COMMUNICATIONS IN A CDMA CELLULAR TELEPHONE SYSTEM", and U.S. Pat. No. 5,109,390 entitled "DIVERSITY RECEIVER IN A CDMA CELLULAR TELEPHONE SYSTEM", both assigned to the assignee of the present invention and incorporated by reference herein.

In a communication system, such as CDMA, that provides data using a Quaternary Phase Shift Keying (QPSK) modulation format, information regarding the transmitted data signal can be obtained by taking the cross product of the I and Q components of the QPSK signal with the estimate of the communications channel. By knowing the relative phases of the two components, one can determine roughly the velocity of the mobile station in relation to the base station. A description of a circuit for determining the cross product of the I and Q components with the channel estimate in a QPSK modulation communication system is disclosed in U.S. Pat. No. 5,506,865, entitled "PILOT CARRIER DOT PRODUCT CIRCUIT", assigned to the assignee of the present invention, the disclosure of which is incorporated by reference herein.

There has been an increasing demand for wireless communications systems to be able to transmit digital information at high rates. One method for sending high rate digital data from a central base station to a subscriber unit is to allow the base station to send the data using spread spectrum techniques of CDMA. One proposed method allows the remote station to transmit its information using a small set of orthogonal channels, this method is described in detail in copending U.S. Pat. Ser. No. 08/886,604, entitled "HIGH DATA RATE CDMA WIRELESS COMMUNICATION SYSTEM", assigned to the assignee of the present invention and incorporated by reference herein.

Power control is a necessary component of wireless communication systems. A conventional method of power control of a mobile station, or reverse link power control, in a communication system is to monitor the power of the received signal from the mobile station at a base station. The base station in response to the monitored power level transmits power control bits to the mobile station at regular intervals. A method and apparatus for controlling transmission power in this fashion is disclosed in U.S. Pat. No. 5,056,109, entitled "METHOD AND APPARATUS FOR CONTROLLING TRANSMISSION POWER IN A CDMA CELLULAR MOBILE TELEPHONE SYSTEM", which is assigned to the assignee of the present invention and incorporated by reference herein.

However, conventional methods of power control may not apply to the forward link in high data rate systems. Conventional methods of power control typically use known properties of pilot signals to estimate channel characteristics. In the forward link of high data rate systems, these known properties may not be present. The forward link pilot signal in a high data rate system may not be power controlled for a single subscriber unit, and also, may not be transmitted on a dedicated pilot channel.

There is a need in high data rate wireless communication systems for an efficient method of power control of a base station, or forward link power control. There is also a need in high data rate wireless communication systems to monitor the power of the received signal from the base station at a subscriber unit, and in response to the monitored power level, transmit power control bits from the subscriber unit on the reverse link to the base station at regular intervals.

SUMMARY

The disclosed embodiments present a novel and improved method and apparatus for performing forward link closed loop power control. Accordingly, in one aspect, a method of forward link power control in a wireless communications system includes the steps of selecting a power controlled forward link signal, calculating a bit error rate for the selected signal, calculating a variance for the selected signal, and calculating a forward link power control set point from the bit error rate and the variance.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
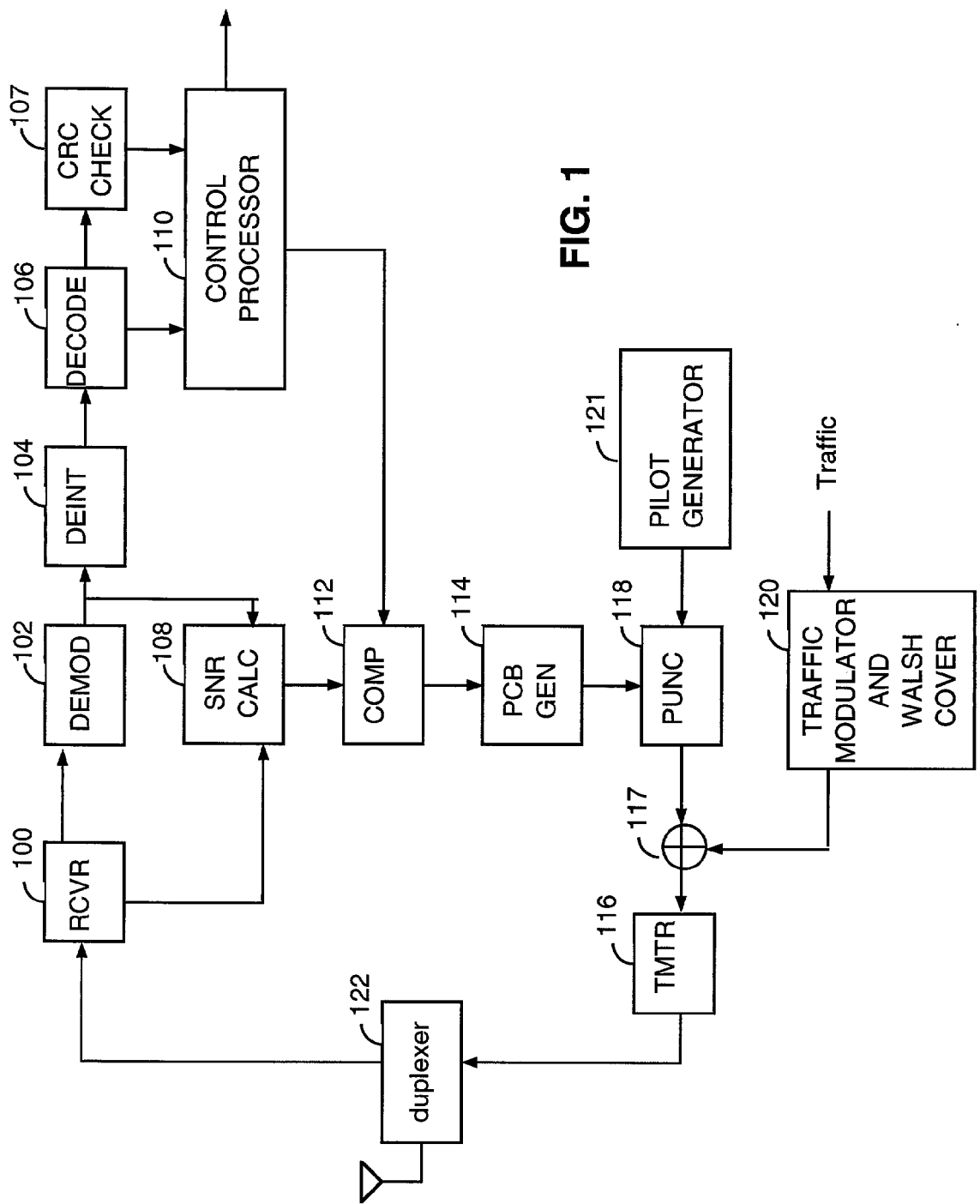
FIG. 1 is a block diagram of a closed loop power control system.

The disclosed embodiments present a method of implementing closed loop power control on the forward link of high data rate wireless communications systems. Such a method is especially useful when the data signals are only present in short burst such that packet or frame error rates (PER or FER) cannot be estimated accurately. Moreover, since this method provides a mechanism for accurate set point adjustment on the forward link even without a PER (FER) estimate, it can also be used to improve the accuracy of outer loop performance when such estimates do become available. The disclosed embodiments estimate bit error rates for selected power controlled signals on the forward link. Additionally, the normalized variance of the signal energy (or C/I) for each packet is estimated, and the average number of locked fingers are also used to determine the power control set point.

The disclosed embodiments describe a method of determining the set point of a closed loop power control system. In an exemplary embodiment, the method and apparatus are applied to a packet data transmission system. In packet data transmission systems, data and signaling is transmitted in bursts, while a significant period of time may elapse between the burst transmissions. The exemplary embodiments are discussed in terms of a system optimized for packet data transmission in a wireless communication system as described in detail in copending U.S. patent application Ser. No. 08/963,386, filed Nov. 3, 1997 and entitled "METHOD AND APPARATUS FOR HIGHER RATE PACKET DATA TRANSMISSIONMETHOD AND APPARATUS FOR HIGHER RATE PACKET DATA TRANSMISSION", which is assigned to the assignee of the present invention and incorporated by reference herein. The disclosed embodiments may also be extended to other proposed systems that are planned to carry packet data transmissions, such as the Telecommunications Industry Association proposal to the International Telecommunications Union (ITU) entitled "The cdma2000 ITU-R RTT Candidate Submission" and the European Telecommunications Standard Institute proposal to the International Telecommunications Union (ITU) entitled "The ETSI UMTS Terrestrial Radio Access (UTRA) ITU-R RTT Candidate Submission".

The disclosed embodiments can be applied when the data signals are transmitted in short bursts so that packet or frame error rates (PER or FER) cannot be estimated accurately, and on the forward link where the pilot signal may not have power control or a dedicated channel. Moreover, because the disclosed embodiments provide a mechanism for accurate set point adjustment even without PER (FER) estimates from dedicated power controlled pilot channels, the embodiments can also be used in conjunction with such estimates to improve the accuracy of outer loop performance when such estimates are available.

The disclosed embodiments describe setting the forward link power control set point based on an artificially created bit error rate, where each artificial "bit" consists of a number of chips from a selected forward link signal distributed over a frame or fraction of a frame. In an exemplary embodiment, the set point is determined additionally in accordance with a normalized variance of the signal energy (or signal to noise interference) per PCB for each packet and additionally employs the number of fingers in lock to determine the set point. By employing these two additional factors the set point can be determined to provide a good indication of signal quality almost independent of the channel characteristics, e.g. different Doppler spectrum. Thus, it is possible to determine the forward link closed loop power control set point (T) based on these factors.

In an exemplary IS-2000 embodiment, a Power Control Group (PCG) is 1.25 millseconds (ms), or 1536 chips, in length. Each forward PCG contains one power control bit (PCB), or command to either increase or decrease the mean subscriber unit output power level. Sixteen PCGs are transmitted in each 20 ms frame on a Forward Power Control Sub-channel (FPCS). The FPCS consists of PCGs punctured into randomized positions on the Forward Fundamental Channel (F-FCH) or the Forward Dedicated Control Channel (F-DCCH).

FIG. 1 illustrates a conventional system for generating closed loop forward link power control commands at a subscriber unit. A signal is received at an antenna, demultiplexed by demultiplexer 122, and then provided to receiver (RCVR) 100. Receiver 100 down converts, amplifies and filters the received signal and provides the received signal to demodulator 102. Demodulator 102 demodulates the received signal. Within demodulator 102 is a channel estimate generator (not shown), which estimates the channel characteristics based on a transmitted signal with values known to both the transmitter and the receiver, referred to herein as the selected power controlled signal. The selected power controlled signal is demodulated and the phase ambiguities in the received signal are resolved by taking the dot product of the received signal and the pilot signal channel estimate. The demodulated signal is typically provided to a deinterleaver 104, which reorders the demodulated symbols in accordance with a predetermined reordering format.

The reordered symbols are provided to decoder 106. The decoded symbols are then optionally provided to a cyclic redundancy check (CRC) bit check element 107. CRC check element 107 locally generates a set of CRC bits from the decoded data and compares those locally generated bits with the estimated received CRC bits. CRC check element 107 provides a signal indicative of the checking of the CRC bits to control processor 110. In addition, decoder 106 may provide other quality metrics such as Yamamoto metric or symbol error rate to control processor 110. In response, control processor 110 outputs either the decoded frame of data or a signal indicative of the erasure of a frame.

In any communication system there is a nominal performance rate. In conventional systems, the performance is determined based upon the frame error rate of the received signal. The frame error rate depends on the average received signal to noise ratio (SNR) of the received signal and other quality metric(s) related to the received signal. When the frame error rate is less than the target frame error rate, the power control set point is decreased. Conversely, when the frame error rate is greater than the target frame error rate, the set point is increased. In one method for adjusting the signal to noise ratio threshold, the set point is increased by a relatively large amount, for example 1 dB, whenever a frame erasure is detected. Conversely, the signal to nose ratio threshold is decreased by 0.01 dB whenever a frame is properly decoded. Control processor 110 provides the set point to comparator (COMP) 112. In a conventional pilot assisted coherent communication system, the signal to noise ratio is estimated based on the pilot signal. An exemplary method for estimating the signal to noise ratio based on the pilot signal is disclosed in copending U.S. Pat. No. 5,903,554, entitled "METHOD AND APPARATUS FOR MEASURING LINK QUALITY IN A SPREAD SPECTRUM COMMUNICATION SYSTEM", assigned to the assignee of the present invention and incorporated by reference herein.

The demodulated signal from demodulator 102 is provided to signal to noise ratio calculator (SNR CALC) 108. Signal to noise ratio calculator 108 computes the signal energy based on the energy of the demodulated symbols and input from the channel estimate generator (not shown). In addition, a signal indicative of the received in-band energy is provided to signal to noise ratio calculator 108. Signal to noise ratio calculator 108 generates an estimate of the signal to noise ratio of the received signal and provides this estimate to comparator 112.

In comparator 112, the estimated signal to noise ratio is compared with the power control loop set point provided by control processor 110. A signal indicative of the result of the comparison is provided to power control bit generator 114. If the estimated SNR is less than the set point, then power control bit generator 114 provides a message requesting that the transmitting device increase the energy of its transmissions. If the estimated SNR is greater than the set point, then power control bit generator 114 provides a message requesting that the transmitting device decrease the energy of its transmissions.

The power control message which is a single bit message requesting the transmitting device to increase or decrease its transmission energy by a predetermined amount is provided to puncturing element 118. Puncturing element 118 receives pilot signal from pilot signal generator 121 and punctures the power control message into the pilot signal in a predetermined fashion. The pilot channel including the power control data is then combined by combiner 117 with the traffic channel output of traffic modulator and walsh cover element 120. The combined channels are upconverted, filtered and amplified for transmission by the transmitter 116. In response to the power control messages, the transmitter 116 increases or decreases the energy of its transmissions in a predetermined fashion. The output of transmitter 116 is provided to demultiplexer 122 for broadcast by an antenna.

Figure 2:
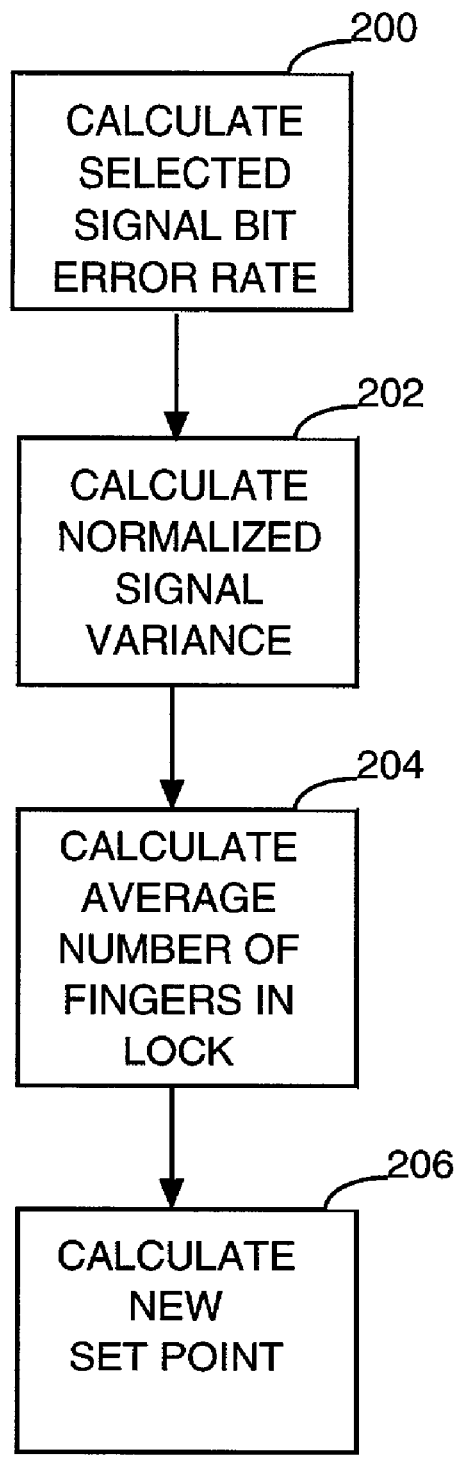
FIG. 2 is a flowchart illustrating a method for determining a closed loop set point.

In FIG. 2, an exemplary embodiment of a method for determining the forward link power control set point is illustrated. Unlike methods for determining the power control set point on the reverse link, the disclosed embodiments do not rely on the pilot channel. The pilot channel can be relied on in determining power control set points on the reverse link because the reverse link pilot channel is dedicated and power controlled even when there is no traffic transmitted on the reverse link. Because the forward link pilot signal may be shared in a Code Division Multiplexed (CDM) scheme, and is not guaranteed to be power controlled, the disclosed embodiments employ novel use of other forward link signals. The disclosed embodiments employ symbols, channels, or signals that are power controlled based on the channels conditions of the subscriber unit. If, in an IS2000 or WCDMA system, the pilot channel is dedicated and power controlled for a specific subscriber unit, the pilot channel signal may be employed. One skilled in the art will understand that ordering of steps illustrated in FIG. 2 is not limiting. The method is readily amended by omission or re-ordering of the steps illustrated and without departing from the scope of the disclosed embodiments. The disclosed embodiments are described in the context of CDMA phones. However, the disclosed embodiments are equally applicable to other modulation techniques.

In step 200, the bit error rate of a selected power controlled forward link signal is computed. The selected signal may be any forward link signal that is dedicated and power controlled. In the exemplary embodiment, the FPCS is the selected signal. One skilled in the art will readily appreciate that the disclosed embodiments are equally applicable to other forward link dedicated and power controlled channel structures such as dedicated pilot symbols in WCDMA.

In the exemplary embodiment, the FPCS is punctured into the F-FCH or the F-DCCH. The FPCS consists of power control feed back commands, or PCBs, to the subscriber unit instructing the subscriber unit to raise or lower output power. In order for the power control commands to be correctly received by the subscriber unit, the punctured PCBs are also power controlled. Forward link PCBs are punctured into the F-FCH or F-DCCH regardless of the presence of traffic. When no traffic is present on the F-FCH or F-DCCH, the FPCS continues to be transmitted in order to keep reverse link transmission power at a correct level. Due to the described characteristics of the PCBs punctured into the FPCS, the received PCBs are employed to generate bit error and variance metrics at the subscriber unit.

To compute the bit error rate for the selected signal, an actual bit or an artificial "bit" created from sample segments of the selected signal is compared to a threshold value of amplitude or sign. The selected Signal Bit Error Rate (SSBER) is calculated by dividing the number of erasures in a group of bits by the total number of bits in the group, i.e.

$$SSBER = (\text{number of erasures in a group of } N \text{ bits})/(N), \quad (1)$$

where N is the total number of bits in the group of bits. N, the total number of bits per group, and T, comparison threshold levels, as well as the length of signal samples, are system design parameters. An exemplary method for creating artificial bits and corresponding proxy bit error rates is disclosed in copending U.S. patent application Ser. No. 09/438,988, entitled "METHOD AND APPARATUS FOR MONITORING TRANSMISSION QUALITY", assigned to the assignee of the present invention and incorporated by reference herein. If, in an IS2000 or WCDMA system, the pilot channel is dedicated and power controlled for the subscriber station, the SSBER can be generated from the pilot channel signal. An exemplary method for creating a pilot bit error rate is disclosed in copending U.S. patent application Ser. No. 09/370,081, entitled "METHOD AND APPARATUS FOR DETERMINING THE CLOSED LOOP POWER CONTROL SET POINT IN A WIRELESS PACKET DATA COMMUNICATIONS SYSTEM", assigned to the assignee of the present invention and incorporated by reference herein.

In the exemplary embodiment, the SSBER is calculated for the FPCS. Correct amplitude values for the PCBs are 1 and −1. PCB errors occur when additive noise causes the received amplitude value to change sign. PCB errors are determined by setting an absolute amplitude threshold value (T) and comparing the absolute amplitude value of the received PCB to the threshold. If the absolute amplitude value of the received PCB is less than the threshold, the received PCB comprises an erasure, or bit error, namely $$\text{if } |A_1| < T, A_1 \text{ is a bit error, where } A_1 = 1, 2, 3 \ldots N. \tag{2}$$

In another embodiment, the sign of a received fraction of a PCB can be compared to the sign of the entire PCB. When the SSBER has been calculated, control flow proceeds to step 202.

In step 202, the normalized signal variance is calculated. While the SSBER is related to the frame error rate, it is also a function of vehicle speeds and other channel characteristics. An exemplary embodiment describes a method for compensating for the effect of vehicle speed by using the normalized variance of the received signal power or C/I as described below.

In the exemplary embodiment, the forward link closed loop power control commands are transmitted 800 times per second, i.e., 16 PCBs are transmitted every 20 ms. In the exemplary embodiment, the normalized signal power variance is defined as:

$$\rho = \sqrt{\frac{\overline{p(n)^2} - \overline{p(n)}^2}{\overline{p(n)}^2}} = \sqrt{\frac{\overline{p(n)^2}}{\overline{p(n)}^2} - 1}, \tag{3}$$

where $p(n)$ is the measured power of the FPSC during the nth frame, $\overline{p(n)}^2$ is the average of the squared energy of the whole or fractional PCBs for the current frame, and $\overline{p(n)^2}$ is the average energy of the demodulated PCB or fractional PCB squared for the current frame.

It can be observed that the SSBER and the normalized signal variance have different trends with respect to vehicle speed. Thus, it is possible to construct a linear combination of these two quantities, SSBER+•$_1$•, which is nearly a constant independent of vehicle speeds. Practically, the average estimates of p and $p^2$ can be computed by passing these estimates through a single pole low-pass filter defined as:

$$\overline{p}(n) = c_1 \overline{p}(n-1) + c_2 \cdot p(n) \tag{4}$$

and $$\overline{p^2}(n) = c_3 \overline{p^2}(n-1) + c_4 \cdot p^2(n) \tag{5}$$

where n is the frame index. When the selected signal variance value is calculated, control flow proceeds to step 204.

In step 204, the number of fingers in lock is computed. In the process of RAKE reception, the signal strength of each demodulated finger is computed. The signal strength must be in excess of a threshold value in order for it to be soft combined by the RAKE receiver. When the signal strength is sufficient that it is worthy of being soft combined, the finger is said to be "in lock". In the improved embodiment, the impact of multiple fingers is compensated for by making the set point a function of the average number of fingers that are in lock ($N_f$). In the exemplary embodiment, a determination as to whether a finger is in lock is conducted for each PCG. In the exemplary embodiment, the average number of fingers in lock is computed by summing the number of fingers in lock for each PCG in the frame and dividing by the number of PCGs in a frame. Control flow proceeds to step 206.

In step 206, the set point is calculated. The first step in calculating the set point is to generate a metric ($\eta$) that is a function of the three factors described above. In the exemplary embodiment, the SSBER metric is modified by the addition of a term that is a linear function of $N_f$, the number of fingers, works quite well. In the exemplary embodiment, the metric ($\eta$) is generated in accordance with the following equation:

$$\eta(n) = SSBER(n-1) + \bullet_1 \bullet (n-1) + \bullet_2 N_f(n-1), \tag{6}$$

where, in the exemplary embodiment, $\eta(n)$ is the metric for the current (nth) frame, SSBER(n-1) is the selected signal bit error rate for the previous ((n-1)st) frame, • (n-1) is the selected signal variance for the previous ((n-1)st) frame, $N_f(n-1)$ is the number of fingers in lock in the previous frame, and •$_1$ and •$_2$ are scaling constants.

The outer loop threshold can be improved by accumulating statistics regarding the frame error rate. An error for the current frame (•(n)) is calculated according to the equation:

$$\bullet(n) = \eta(n) - C. \tag{7}$$

The set point for the current frame (T(n)) is modified according to the equation:

$$T(n) = T(n-1) + \Delta \bullet (n). \tag{8}$$

Figure 3:
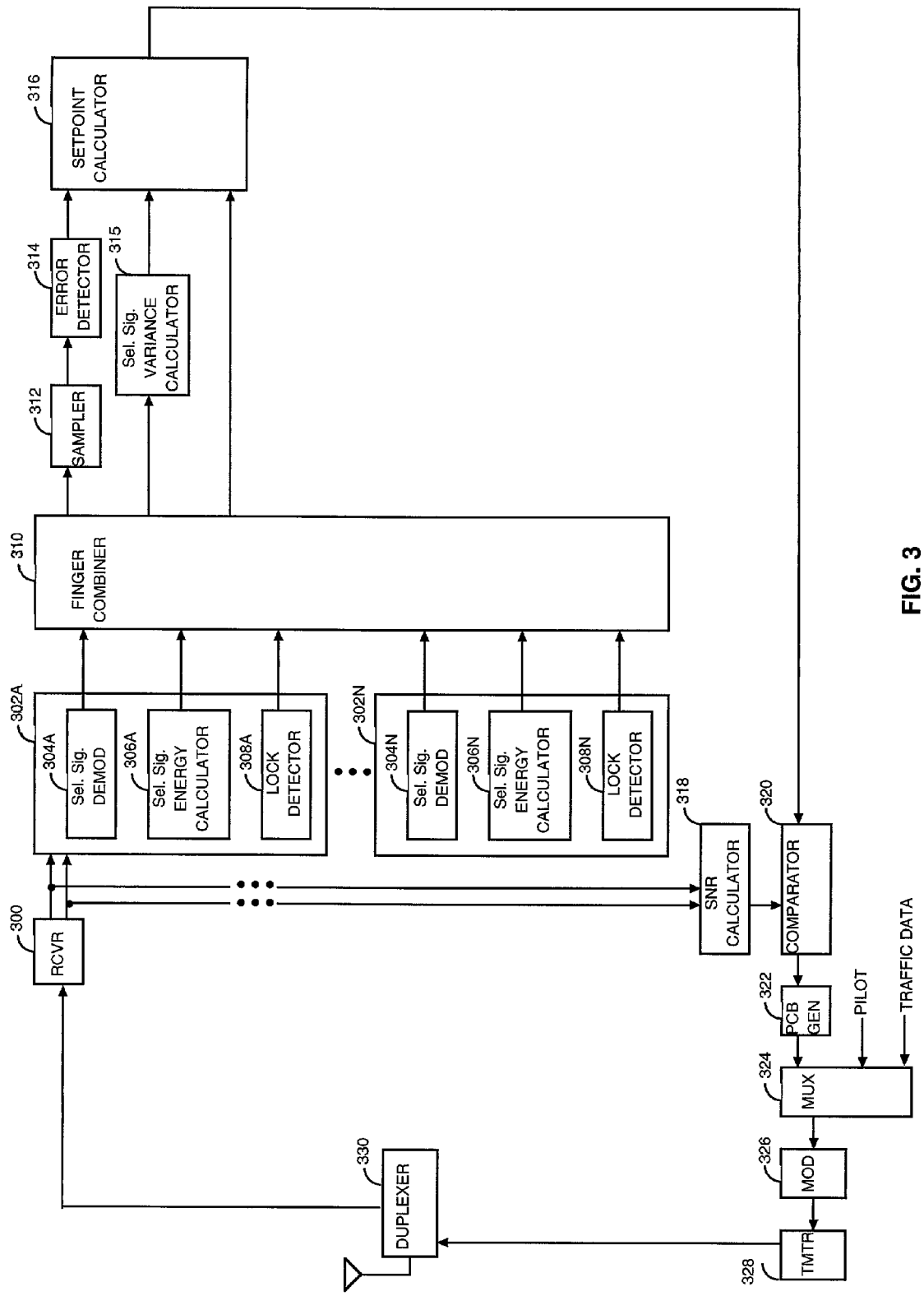
FIG. 3 is a block diagram illustrating apparatus for generating closed loop power control commands.

FIG. 3 illustrates an exemplary embodiment of an apparatus for determining the outer loop set point. The selected signal is received at an antenna, demultiplexed by demultiplexer 330, and then provided to receiver (RCVR) 300. Receiver 300 downconverts, amplifies and filters the received signal. In the exemplary embodiment, receiver 300 down converts the received signal in accordance with a quaternary phase shift keying (QPSK) format and provides the resultant in-phase and quadrature-phase components to metric calculators 302. In the exemplary embodiment, a separate metric calculator 302 is provided for each finger being demodulated by the receiver system.

In each of metric calculators 302, Selected signal demodulator (Sel. Sig. DEMOD) 304 demodulates the received selected signal symbol stream to provide estimates of the received selected signal symbols and provides those demodulated symbols to finger combiner 310. In each of metric calculators 302, selected signal energy calculators 306 compute the energy of received selected signal symbols and provide the measured energies to finger combiner 310. In addition, in each of metric calculators 302, lock detectors 308 determine whether the finger corresponding to the metric calculator 302 is in lock. Diversity reception in a CDMA communication system is well known in the art and is described in detail in aforementioned U.S. Pat. No. 5,109,390.

Finger combiner 310 sums the demodulated selected signal symbol energies from each of selected signal demodulators 304, sums the selected signal symbol energies from each of selected signal energy calculators 306, and sums the number of fingers determined to be in lock to provide the number of fingers in lock value $N_f$.

The combined selected signal symbols are provided to optional sampler 312. Sampler 312 decimates the demodulated selected signal symbol stream and provides the decimated stream to error detector 314. Because the values of the transmitted symbols are known to the receiver, detecting errors comprises comparing the received selected signal symbol estimates decimated or intact to the expected selected signal symbol sequence. In the exemplary embodiment, the selected FPSC symbols are either positive or negative 1, which are in represented as a positive or negative amplitude respectively. Thus, whenever the demodulated selected FPSC symbol has an amplitude value not within a threshold range of 1 t−1, a selected signal bit error is declared by error detector 314. The number of detected selected signal bit errors (SSBER) is provided to set point calculator 316.

The combined selected signal symbol energies, p(n), are provided to selected signal variance calculator 315 which computes the normalized signal variance •(n) as described in equations (3)–(5) above and provides the result to set point calculator 316.

Each of metric calculators 302 provides a signal indicative as to whether the finger to which the metric calculator is assigned is in lock during that slot. Finger combiner 310 sums the number of slots for which each of the fingers is in lock and divides by the number of slots in a frame to provide the average number of fingers in lock $N_F$. Finger combiner 310 provides a signal indicative the value $N_F$ to set point calculator 316.

In the exemplary embodiment, set point calculator 316 determines the set point (T) in accordance with equations (6)–(8) above. Set point calculator 316 provides the set point (T) to comparator 320. Receiver 300 provides the base band samples to signal to noise ratio calculator 318. A large number of methods are known in the art to estimate the signal to noise ratio. A simple method for estimating the noise energy is to assume all in-band energy is noise. Receiver 300 typically includes an automatic gain control device (not shown) and the in-band energy can typically be estimated based on the scaling of the received signal by the automatic gain control device. The signal energy can be estimated based on the energy of the demodulated traffic or pilot symbols. A number of methods for estimating the signal to noise ratio are disclosed in copending U.S. application Ser. No. 08/722,763, filed Sep. 27, 1996 and entitled "METHOD AND APPARATUS FOR MEASURING LINK QUALITY IN A SPREAD SPECTRUM COMMUNICATION SYSTEM", which is assigned to the assignee of the present invention and incorporated by reference herein.

The estimated signal to noise ratio is provided to comparator 320. In comparator 320, the estimated signal to noise ratio is compared to the threshold value (T). The power control command requesting that the transmitter either increase or decrease its transmission energy is determined in accordance with this comparison. The result of the comparison is provided to power control bit generator (PCB GEN) 322. If the estimated signal to noise energy exceeds the threshold (T), then power control bit generator 322 provides a message requesting that the remote station reduce its transmission energy. Conversely, if the estimated signal to noise energy is less than the threshold (T), then power control bit generator 322 provides a message requesting that the remote station increase its transmission energy.

The power control command from power control bit generator 322 is provided to multiplexer 324. In the exemplary embodiment, the power control commands are time multiplexed with traffic data as described in the aforementioned copending U.S. application Ser. No. 08/963,386. One skilled in the art will appreciate that although illustrated in a system in which the power control commands are time multiplexed into the transmitted frames of data, the present invention is equally applicable to communication systems in which the power control bits are punctured into the transmitted signals such as in the cdma2000 or WCDMA proposed systems.

The multiplexed frames of data are modulated by modulator 326. In the exemplary embodiment, the modulation is a spread spectrum communication signal. The modulated symbols are then provided to transmitter (TMTR) 328. Transmitter 328 up converts, amplifies and filters the signal for transmission. The output of transmitter 328 is provided to demultiplexer 330 for broadcast by an antenna.

Figure 4:
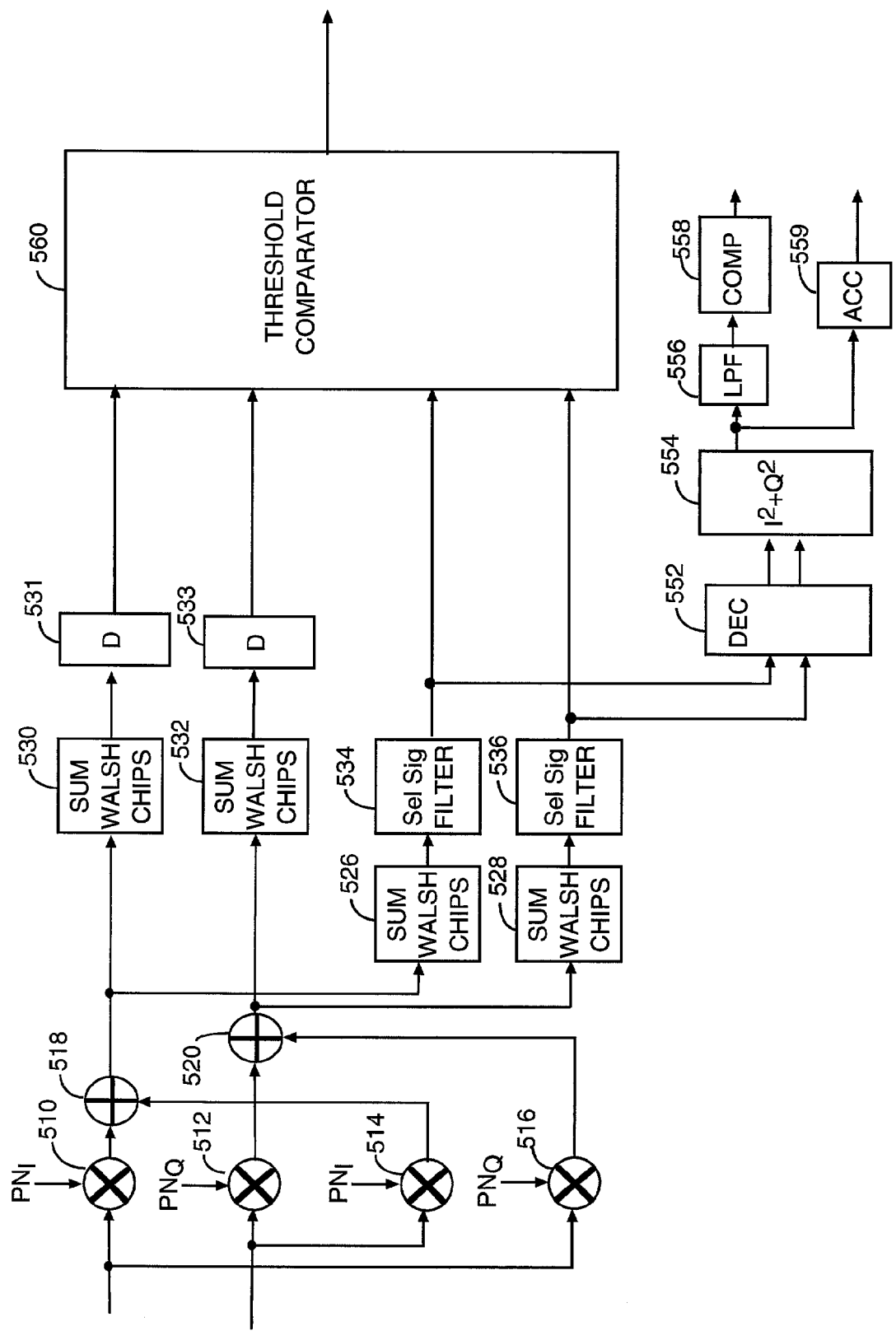
FIG. 4 is a block diagram illustrating a method of generating metrics to be used in the in the determination of a closed loop set point.

FIG. 4 illustrates an exemplary embodiment of an expanded functional block diagram of metric calculators 302. As previously described, receiver (RCVR) 300 downconverts the received reverse link RF signals to a baseband frequency, producing I and Q baseband signals. In the exemplary embodiment, the received signal is complex PN spread using an in-phase $PN_I$ sequence and a quadrature phase $PN_Q$ sequence by methods that are well known in the art and are described in detail in the aforementioned U.S. patent application Ser. No. 08/886,604. Despreaders 510 and 512 respectively despread the I and Q signals using the $PN_I$ sequence. Similarly, despreaders 514 and 516 respectively despread I and Q signals using the $PN_Q$ sequence. The outputs of despreaders 510 and 514 are combined in combiner 518. The output of despreader 516 is subtracted from the output of despreader 512 in combiner 520.

The respective outputs of combiners 518 and 520 have their Walsh covers stripped by a Walsh Decover (not shown), and are summed by accumulators 530 and 532. The outputs of accumulators 530 and 532 are a short term summation of the selected signal. The outputs of accumulators 530 and 532 are provided to delay elements 531 and 533, respectively. Delay elements 531 and 533 are provided in order to equalize the additional delay that the filtered selected signal experiences as a result of the filtering operating performed by selected signal filters 534 and 536. Delay elements 531 and 533 may also center the Finite Impulse Response (FIR) filter, if one is used in filtering. The respective outputs of combiners 518 and 520 are also summed by accumulators 526 and 528. The output of accumulators 526 and 528 are a long term summation of the selected signal. In embodiments where the comparison threshold is fixed, long term summation is not necessary, and elements 526, 528, 534, and 536 may be eliminated. The respective outputs of accumulators 526 and 528 are then applied to selected signal filters 534 and 536. Selected signal filters 534 and 536 generate an estimation of the channel conditions by determining the estimated power and phase of the selected signal data. The output of selected signal filter 534 and 536, as well as the squared and summed outputs of delay elements 531 and 533 are input to a threshold comparator 560 to compare the demodulated FPCS symbols to fixed threshold values for expected PCB values. In the exemplary embodiment, threshold comparator 560 outputs a decision on the sign of the PCB, or an erasure indicator for the PCB. In other embodiments where threshold values are not fixed, the threshold value is provided by the long term summation output of selected signal filters 534 and 536, rather than a fixed value within the threshold comparator 560.

In addition, the output of selected signal filters 534 and 536 are provided to decimator 552. In the exemplary embodiment, selected signal filters 534 and 536 are moving average filters that average the amplitudes of the received selected signal symbols over a PCB, or fraction of a PCB. Decimator 552 samples the outputs of selected signal filters 534 and 536 at PCB boundaries to provide the average symbols amplitudes for each PCB in the frame.

The average symbol amplitudes averaged over each PCB in the frame are provided to energy calculator ($I^2+Q^2$) 554. Energy calculator 554 sums the squares the amplitudes of the samples from selected signal filters 534 and 536 and provides the resultant energy values to accumulator (ACC) 559. Accumulator 559 accumulates the energy of the PCBs over a frame duration and outputs the accumulated frame energy to set point calculator 316. In addition, the average PCB energy values from energy calculator 554 are provided to low pass filter (LPF) 556. In the exemplary embodiment, low pass filter 556 computes the average selected signal symbol energy over multiple PCBs and provides this value to comparator 558. Comparator 558 compares the average selected signal symbol energy to a threshold value and based on this comparison determines whether the finger is in lock. Comparator 558 outputs the result of the comparison to finger combiner 310. It will be understood by one skilled in the art that there are many variations on the method presented herein for determining whether a finger is in lock and that the method present is for illustrative purposes.

Figure 5:
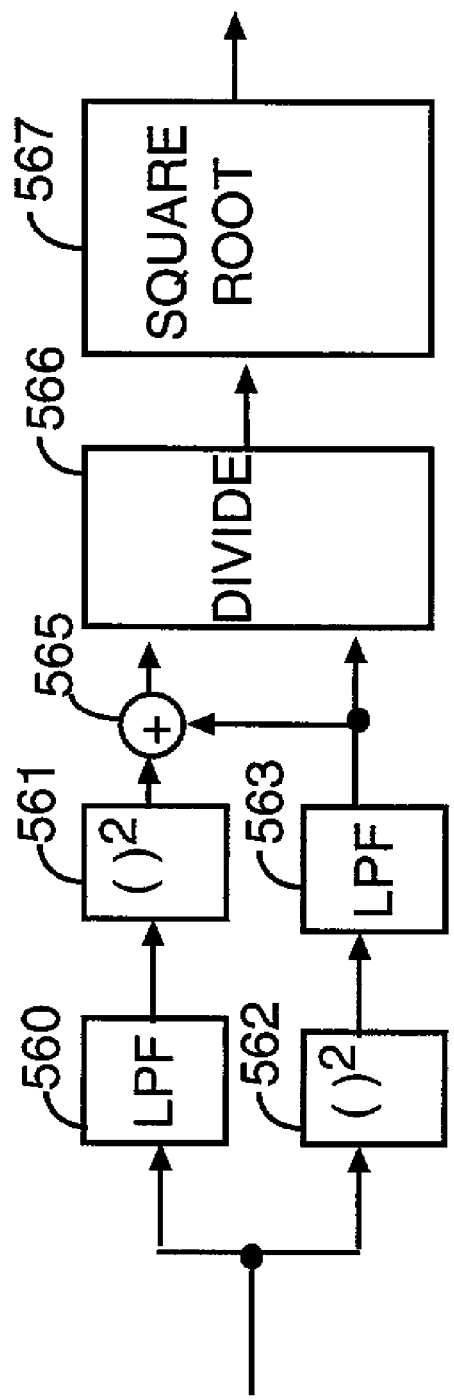
FIG. 5 is a block diagram illustrating an exemplary apparatus for calculating normalized signal variance for determination of a closed loop set point.

FIG. 5 illustrates an exemplary embodiment of normalized signal variance calculator 315. In one embodiment, the selected signal symbol energies from accumulator 559 of each of selected signal energy calculators 306 are summed in finger combiner 310 and provided to low pass filter (LPF) 560 and squaring element 562. In the exemplary embodiment, low pass filter 560 is a single pole IIR averaging filter that computes the average symbol energy, $\bar{p}(n)$, of the combined selected symbol energy over multiple frame duration. In the exemplary embodiment, the average symbol energy is computed in accordance with equation (4) above. The average symbol energy $\bar{p}(n)$ is provided to squaring element 561, which computes the square of the average symbol energy, $\bar{p}(n)^2$, and provides the value to a first input of summer 565.

Squaring element 562 squares the amplitudes of the combined symbol energies and provides the squared amplitude values to low pass filter (LPF) 563. Low pass filter 563 is an single pole IIR filter that computes the average of the squared energy values over the frame's duration, $\overline{p(n)^2}$. The output from low pass filter 563 is provided to a second summing input of summer 565. Summer 565 computes the sum of the square of the average symbol energy, $\bar{p}(n)^2$ and the average of the squared symbol energies, $\overline{p(n)^2}$ and provides that sum to the numerator input of divider 566. Low pass filter 562 also provides the average of the squared energies to the denominator input of diving element 566. Dividing element 566 divides the sum from summer 565 by the average of the squared energies from low pass filter 562. The result of the division is provided to square root element 567 which calculates the square root of the division performed by dividing element 566. In the exemplary embodiment, the square root operation is performed by means of a table look up. It will be understood by one skilled in the art that other methods of determining the square root value are known and can be applied to the disclosed embodiments without departing from the application's scope.

In other exemplary embodiments, a mean variance may be calculated from multiple variance values produced by multiple normalized signal variance calculators 315. For example, when the selected signal is the FPCS, two normalized signal variance calculators 315 are used. One normalized signal variance calculator 315 calculates the variance of the PCBs valued at positive 1, while a second normalized signal variance calculator 315 calculates the variance of the PCBs valued at negative 1. The mean variance for the FPCS signal is calculated from the two individually produced variance values.

Thus, a novel and improved method and apparatus for determining the forward link closed loop power control set point in a wireless packet data communication system have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are represented by voltages, currents, electromagnetic waves, magnetic fields or particles, optical fields or particles, or any combination thereof.

The previous description of the preferred embodiments is provided to enable any person skilled in the art to make or use the disclosed embodiments. The various modifications to these embodiments will be readily apparent to those skilled in the art, and the generic principles defined herein may be applied to other embodiments without the use of the inventive faculty. Thus, the disclosed embodiments are not intended to be limited to the embodiments shown herein but is to be accorded the widest scope consistent with the principles and novel features disclosed herein.

We claim:

1. A method of forward link power control in a wireless communications system comprising:
    selecting a power controlled forward link signal;
    calculating a bit error rate for the selected signal;
    calculating a variance for the selected signal;
    calculating a forward link power control set point from the bit error rate and the variance; and
    determining a forward link signal power level based on the forward link power control set point.

2. The method of claim 1 wherein the selected signal is the forward link power control sub-channel.

3. The method of claim 1 further comprising calculating the average number of fingers in lock and further calculating a forward link power control set point from the number of fingers in lock.

4. A wireless communications receiver comprising:
means for selecting a power controlled forward link signal;
means for calculating a bit error rate for the selected signal;
means for calculating a variance for the selected signal;
means for calculating a forward link power control set point from the bit error rate and the variance and determining a forward link signal power level based on the forward link power control set point.

5. The wireless communications receiver of claim 4 further comprising means for calculating an average number of fingers in lock.

6. The wireless communications receiver of claim 4 wherein the means for selecting a signal selects a forward link power control sub-channel signal.

7. The wireless communications receiver of claim 4 wherein the receiver comprises a subscriber unit.

8. A wireless communications receiver comprising:
a selector for selecting a power controlled forward link signal;
a calculator for calculating a bit error rate for the selected signal;
a variance calculator for calculating a variance for the selected signal;
a calculator for calculating a forward link power control set point from the bit error rate and the variance and determining a forward link signal power level based on the forward link power control set point.

9. The wireless communications receiver of claim 8 wherein the selector for selecting a signal selects a forward link power control sub-channel signal.

10. The wireless communications receiver of claim 8 further comprising a lock detector for calculating an average number of fingers in lock.

11. An apparatus for generating forward link closed loop power commands comprising:
a signal demodulator for demodulating a selected forward link power controlled signal;
a signal energy calculator for calculating the energy of the selected signal;
a lock detector for detecting the number of receiver fingers in lock;
a signal variance calculator for determining the variance of the selected signal; and
a setpoint calculator for determining a forward link power control setpoint and
a bit generator for determining a forward link signal power level based on the forward link power control set point.

12. Apparatus for determining a forward link power control set point, comprising:
a calculator for calculating a selected forward link signal bit error rate; and
a calculator for calculating a forward link power control set point in accordance with the selected signal bit error rate and
a generator for determining a forward link signal power level based on the forward link power control set point.

13. The apparatus of claim 12 wherein the calculator for calculating the selected signal bit error rate, comprises:
a selected signal symbol demodulator for demodulating received selected signal symbols; and
a comparator for comparing the demodulated selected signal symbols to a predetermined symbol sequence.

14. The apparatus of claim 12 wherein the calculator for calculating the selected signal bit error rate, further comprises:
a channel analyzer for determining at least one channel characteristic; and
a power control set point calculator for calculating the forward link power control set point in accordance with the selected signal bit error rate and the at least one channel characteristic.

15. The apparatus of claim 12 wherein the selected signal demodulator comprises:
a channel estimator for generating a channel estimate in accordance with the received selected signal symbols; and
a dot product circuit for computing the dot product between the channel estimate and the received selected signal symbols.

16. The apparatus of claim 15 wherein the channel estimator comprises:
a Walsh summer for accumulating a predetermined number of selected signal symbols; and
a selected signal filter for low pass filtering the accumulated selected signal symbols.

17. The apparatus of claim 11 wherein the selected signal demodulator comprises:
a complex PN demodulator for demodulating the received signal in accordance with a complex PN despreading format;
a despreading means for despreading the complex PN demodulated selected signal;
a channel estimator for despreading the complex PN demodulated signal and for filtering the despread signal; and
a dot product circuit for computing the dot product of the despread signal and the channel estimate to provide the demodulated selected signal symbols.

18. The apparatus of claim 13 wherein the selected symbol demodulator comprises:
a plurality of selected signal demodulators wherein each of the plurality of selected signal demodulators demodulates a corresponding finger of a diversity receiver to provide selected signal symbol energies; and
a combiner for receiving the selected signal symbol energies and for combining the selected signal symbol energies.

19. The apparatus of claim 12 wherein the apparatus for determining the forward link power control set point, further comprises:
a signal variance calculator for determining the selected signal variance; and
wherein the apparatus for determining the forward link power control set point performs the determination in accordance with the selected signal variance.

20. The apparatus of claim 19 wherein the signal variance calculator for determining the selected signal variance comprises:
a selected signal symbol energy calculator for computing energies of the demodulated selected signal symbols; and
a variance calculator for calculating the variance of the energies of the selected signal symbols.

21. The apparatus of claim 19 wherein the signal variance calculator for determining the selected signal variance comprises:
a plurality of selected signal symbol energy calculators wherein each of the selected signal symbol energy calculators computes energies of the demodulated selected signal symbols of a corresponding finger of a diversity receiver;

a combiner for combining the energies of the selected signal symbols; and a variance calculator for calculating the variance of the combined energies of the demodulated selected signal symbols.

22. The apparatus of claim 20 wherein the variance calculator comprises:

a first filter for receiving the demodulated selected signal symbol energies and for filtering the selected signal symbol energies;

a first squaring multiplier for receiving the filtered demodulated selected signal symbol energy and squaring the filtered demodulated selected symbol energy to provide an average squared selected symbol energy;

a second squaring multiplier for receiving the demodulated selected signal symbol energies and squaring the selected signal symbol energies;

a second filter for receiving the squared demodulated selected signal symbols to provide a squared average selected signal symbol energy;

a summer for receiving the avenge squared selected symbol energy and the squared average selected signal symbol energy and for summing the average squared selected signal symbol energy and the squared average selected signal symbol energy; and a divider for receiving the sum of the average squared selected signal symbol energy and the squared average selected symbol energy and for receiving the average squared selected signal symbol energy and for dividing the sum of the average squared selected signal symbol energy and the squared average selected symbol energy by the average squared selected signal symbol energy.

23. The apparatus of claim 19 wherein the calculator for calculating the forward link power control set point calculates the set point in accordance with a linear combination of the selected signal variance and a selected signal symbol error rate.

24. The apparatus of claim 19 wherein the apparatus for determining the forward link power control set point further comprises:

a lock detector for computing an average number of fingers in lock; and wherein the apparatus for calculating the forward link power control set point performs the calculation in accordance with the average number of fingers in lock.

25. In a first communication device in which at least two forward link channels are transmitted and in which a first forward link channel is transmitted during a larger percentage of the duration of a communication service than the remaining forward link channels, a method for determining the forward link power control set point at a receiver of the at least two channels, comprising:

demodulating the first forward link channel of a received signal;

demodulating the remaining forward link channels of the received signal; and determining the forward link power control set point in accordance with the demodulated first forward link channel and determining a forward link signal power level based on the forward link power control set point.

26. The method of claim 25 wherein the first forward link channel is a forward power control sub-channel.

27. The method of claim 25 wherein the remaining forward link channels comprise a forward fundamental transmission channel.

28. The method of claim 25 wherein the remaining forward link channels comprise a forward dedicated control transmission channel.

29. The method of claim 25 wherein the first communication device is a base station and wherein the second communication device is a subscriber unit.

30. The method of claim 25 wherein determining the forward link power control set point, comprises:

calculating a selected signal bit error rate; and calculating the power control set point in accordance with the selected signal bit error rate.

31. The method of claim 30 wherein calculating the selected signal bit error rate, comprises:

demodulating received selected signal symbols; and comparing the demodulated selected signal symbols to a predetermined selected signal symbol sequence.

32. The method of claim 30 wherein calculating the selected signal bit error rate, further comprises:

determining at least one channel characteristic; and wherein calculating the forward link power control set point calculates the forward link power control set point in accordance with the selected signal bit error rate and the at least one channel characteristic.

33. The method of claim 32 wherein the at least one forward link channel characteristic comprises the relative velocity between the first communication device and the second communication device.

34. The method of claim 31 wherein the demodulating the selected signal symbols, comprises:

generating a channel estimate in accordance with the received selected signal symbols; and computing the dot product between channel the estimate and the received selected signal symbols.

35. The method of claim 34 wherein the generating a channel estimate comprises:

accumulating a predetermined number of selected signal symbols; and low pass filtering the accumulated selected signal symbols.

36. The method of claim 34 wherein the demodulating selected signal symbols, comprises:

demodulating the received signal in accordance with a complex PN despreading format;

despreading the complex PN demodulated signal;

despreading the complex PN demodulated signal and for filtering the despread signal; and computing the dot product of the despread signal and the channel estimate to provide the demodulated selected signal symbols.

37. The method of claim 34 wherein the demodulating the selected signal symbols, comprises:

demodulating a plurality of selected signals wherein each of the plurality of selected signals corresponds to a finger of a diversity receiver; and combining the selected signal symbol energies generated from demodulating.

38. The method of claim 33 wherein determining the forward link power control set point, further comprises:

determining a selected signal variance; and wherein calculating the forward link power control set point comprises performing the calculation in accordance with the selected signal variance.

39. The method of claim 38 wherein determining the selected signal variance comprises:
- computing energies of the demodulated selected signal symbols; and
- calculating the variance of the energies of the demodulated selected signal symbols.

40. The method of claim 38 wherein determining the selected signal variance comprises:
- computing a plurality of selected signal symbol energies wherein each of the selected signal symbol energies corresponds to a finger of a diversity receiver;
- combining the energies of the selected signal symbols; and
- calculating the variance of the combined energies of the demodulated selected signal symbols.

41. The method of claim 40 wherein calculating the variance of the combined energies comprises:
- filtering the selected signal symbol energies;
- squaring the filtered demodulated selected signal symbol energy to provide an average squared selected signal symbol energy;
- squaring the selected symbol energies;
- filtering the squared demodulated selected signal symbols to provide a squared average selected signal symbol energy;
- summing the average squared selected signal symbol energy and the squared average selected signal symbol energy; and
- dividing the sum of the average squared selected signal symbol energy and the squared average selected signal symbol energy by the average squared selected signal symbol energy.

* * * * *